United States Patent [19]

Saito et al.

[11] Patent Number: 5,158,913
[45] Date of Patent: Oct. 27, 1992

[54] METAL BORIDE CERAMIC MATERIAL

[75] Inventors: Hajime Saito, Aichi; Hideo Nagashima, Ebina; Junichi Matsushita, Nagoya, all of Japan

[73] Assignees: STK Ceramics Laboratory Corp.; Toshiba Ceramics Co., Ltd., both of Japan

[21] Appl. No.: 629,025

[22] Filed: Dec. 18, 1990

Related U.S. Application Data

[63] Continuation of Ser. No. 285,572, Dec. 16, 1988, abandoned, which is a continuation-in-part of Ser. No. 155,604, Feb. 12, 1988, Pat. No. 4,873,053.

[30] Foreign Application Priority Data

| Feb. 20, 1987 | [JP] | Japan | 62-35475 |
| Feb. 20, 1987 | [JP] | Japan | 62-35476 |
| Dec. 25, 1987 | [JP] | Japan | 62-328629 |
| Jan. 14, 1988 | [JP] | Japan | 63-6170 |
| Jan. 14, 1988 | [JP] | Japan | 63-6171 |
| Feb. 18, 1988 | [DE] | Fed. Rep. of Germany | 3804982 |

[51] Int. Cl.⁵ .......................... C04B 35/56; C04B 35/58
[52] U.S. Cl. ........................................ 501/87; 501/96
[58] Field of Search ............................. 501/87, 96, 98

[56] References Cited

U.S. PATENT DOCUMENTS

| 2,974,040 | 3/1961 | Fisher et al. | 75/202 |
| 3,376,247 | 4/1968 | Reddy et al. | 501/87 |
| 3,775,138 | 11/1973 | Clougherty et al. | 501/87 |
| 3,843,375 | 10/1974 | Murata | 106/43 |
| 3,895,399 | 1/1975 | Bailey et al. | 264/29 |
| 4,379,852 | 4/1983 | Watanabe et al. | 501/87 |
| 4,539,299 | 9/1985 | Brun et al. | 501/87 |

FOREIGN PATENT DOCUMENTS 486000 9/1975 U.S.S.R. ................. 501/87

Primary Examiner—Theodore Morris
Assistant Examiner—David M. Brunsman
Attorney, Agent, or Firm—Lorusso & Loud

[57] ABSTRACT

A sintered metal boride ceramic body consists essentially of: a metal boride matrix consisting essentially of MB or $MB_2$ and TiC in a and solid solution and $TiB_2$ particles dispersed in the metal boride matrix, wherein M denotes a metal such as Ni and Cr.

7 Claims, 6 Drawing Sheets

METAL BORIDE CERAMIC MATERIAL

This application is a continuation of application Ser. No. 07/285,572, filed Dec. 16, 1988, now abandoned which is a continuation-in-part of copending U.S. application Ser. No. 07/155,604 filed Feb. 12, 1988 and entitled "A Method for Manufacturing A Metal Boride Ceramic Material" now U.S. Pat. No. 4,873,053.

BACKGROUND OF THE INVENTION

This invention relates to a metal boride ceramic material.

Conventional metal boride ceramic materials are manufactured by a hot pressing method, for example, as disclosed in Japanese Patent Laid-Open Nos. 52-106306 and 54-90314.

The conventional metal boride ceramic materials have poor density and low strength even if they are manufactured by hot pressing and sintered.

SUMMARY OF THE INVENTION

The object of this invention is to provide a metal boride ceramic material of high density, high strength and high hardness.

The present invention provides a sintered metal boride ceramic body essentially of: a metal boride matrix consisting essentially of MB or $MB_2$ and TiC as mixed and/or solution condition; and $TiB_2$ particles dispersed in the metal boride matrix, wherein M denotes a metal such as Ni and Cr.

DESCRIPTION OF THE EMBODIMENTS

One embodiment of the invention, is a sintered metal boride ceramic body consisting essentially of a metal boride matrix consisting essentially of CrB and TiC as mixed crystals and/or solid solution, and $TiB_2$ particles dispersed in the metal boride matrix.

A second embodiment of this invention is, a sintered metal boride ceramic body consisting essentially of a metal boride matrix consisting essentially of $Ni_3B$ and TiC as mixed crystals and/or solid solution and $TiB_2$ particles dispersed in the metal boride matrix.

The metal boride matrix functions as a grain boundary layer for the $TiB_2$ particles.

For example, the metal boride is formed by the following equation:

$$TiB_2 + 2Ni + C \rightarrow 2NiB + TiC;$$

$$TiB_2 + Ni + C \rightarrow NiB_2 + TiC; \text{ or}$$

$$TiB_2 + 6Ni + C \rightarrow 2Ni_3B + TiC.$$

In the metal boride matrix, the metal boride (MB and/or $MB_2$) and TiC are in a mixing crystal and/or solid solution so that the pores can be removed. Thus, the $TiB_2$ particles are sufficiently bound densified by the metal boride that the relative density of the sintered ceramic material can be 95% or more. The relative density is equal to (bulk density/theoretical density).

The ceramic body is preferably formed as a sleeve for rolling or looping a wire rod as disclosed in Japanese Patent Application No. 63-112285, a water jet nozzle as disclosed in Japanese Patent Application No. 63-114244, a welding nozzle as disclosed in Japanese Patent Application No. 63-114243 or a molten metal treatment device as disclosed in Japanese Patent Application No. 63-112284 the teachings of which applications are incorporated herein by reference.

According to another embodiment of this invention, a metal boride ceramic material is produced by: mixing (1) metal boride powder with (2) 1-20 wt. % of various metal powders and (3) 0.1-10 wt. % of carbon powder; shaping the mixture; and firing it, wherein the total of the three fractions is 100 wt. %. One or more types of metal boride powder are included as the major component and 1-20 wt. % of one or more types metal powder functions as a binder in the basic structure of the end product.

Why the preferred range for the metal powder is between 1 and 20 wt. % is explained as follows:

The metal particles can improve the wettability of the metal boride powder. The boron in the metal boride, which is reduced by the carbon, combines with the metal particles so as to form a rigid or strong grain boundary phase as a metal boride matrix. If the metal powder is less than 1 wt. %, wettability is not improved so that a suitable microstructure cannot be formed and, as a combination of the metal and the boron in the metal boride is too small in volume, a strong grain boundary phase cannot be formed in the matrix. On the contrary, if the metal powder is more than 20 wt. %, the wettability is reduced, because the combination of the metal and the boron in the metal boride is too large a volume within the matrix and the strength decreases.

The amount of carbon powder is also important. Carbon can further improve wettability of the metal boride powder and acts to produce a M-C phase when it reacts with M wherein M denotes a metal. Also, carbon reduces the metal boride and combines with the metal (M') of the metal boride whereby a M'-C phase is formed as a strong grain boundary phase. If carbon powder is less than 0.1 wt. %, the wettability cannot be improved because the carbon powder is not enough to reduce the metal boride and to produce the M-C and/or M'-C phases. If carbon is more than 10 wt. %, the wettability is inhibited. Thus, excess carbon decreases the strength of the fired body.

According to still another embodiment of the invention, the metal boride ceramic material is made by: mixing (1) metal boride powder with (2) 0.1-89 wt. % metal carbide powder; shaping the mixture; and firing it, wherein the total of the two components is 100 wt. %.

Preferably, the metal boride is the $MB_2$ type boride, or a $M_2B_5$, $M_2B$, $M_5B_3$, $M_3B_2$, MB, $M_3B_4$ or $MB_{12}$ type boride which converts into $MB_2$ upon being heated to an elevated temperature. For example, the $MB_2$ type boride is one or more selected from a group consisting of $TiB_2$, $ZrB_2$, $VB_2$, $NbB_2$, $TaB_2$, $MoB_2$, $MnB_2$, $HfB_2$ and $AlB_2$. The $M_2B_5$, $M_2B$, $M_5B_3$, $M_3B_2$, MB, $M_3B_4$ or $MB_{12}$ type boride is one or more selected from the group consisting of $Ti_2B$, $Ta_2B$, $Cr_2B$, $Mo_2B$, $W_2B$, $Cr_3B_3$, $Nb_3B_2$, $Ta_3B_2$, TiB, NbB, TaB, CrB, MoB, WB, $Nb_3B_4$, $Ta_3B_4$, $Cr_3B_4$, $Ti_2B_5$, $Mo_2B_5$, $W_2B_5$, $ZrB_{12}$ and $MoB_{12}$.

It is also preferable that the metal powder is one or more selected from the group consisting of Cr, Ni, Ti, Mo, Si, Fe and Ta.

The mixture may be fired by a pressureless or a pressure sintering method. In embodiments using the metal carbide powder, the mixture is preferably fired to near the melting point of the metal carbide powder.

Preferably, the metal of the carbide powder is one or more selected from elements of the 3, 4a, 5a, 6a and 8 groups in a periodic table. For example, the metal carbide powder may be chromium carbide, molybdenum carbide, tungsten carbide, nickel carbide or iron carbide.

Why the preferred range for the metal carbide powder is 0.1 and 89 wt. % is as follows:

The metal carbide is decomposed into metal and carbon when it is fired, particularly upon firing to near the melting point of the metal carbide. At that time, the metal particles derived from the metal carbide can improve the wettability of the metal boride powder. The boron in the metal boride which is reduced by the carbon in the metal carbide combines with the metal particles to form a strong grain boundary phase as a metal boride matrix.

The carbon in the metal carbide further improves wettability of the metal powder and acts to produce a M-C phase when it reacts M wherein M denotes a metal. Also, the carbon reduces the metal boride and combines with the metal (M') in the metal boride whereby a M'-C phase is formed as a strong grain boundary phase. If the metal carbide is less than 0.1 wt. %, the wettability cannot be improved, and a suitable microstructure cannot be formed because the combination of boron and metal in the metal boride is too small in volume and no rigid or strong grain boundary phase can be formed. At less than 0.1 wt. % the carbon powder is insufficient to reduce the metal boride and to produce the M-C and/or M'-C phases. On the contrary, if the metal carbide is more than 89 wt. %, the wettability is inhibited. Thus, an excess of remaining carbon decreases the strength of the fired body.

According to a preferred embodiment of this invention, the $TiB_2$ powder particles each has an average particle diameter of 0.5 to 8 micron (for the best results 0.5 to 3 microns), a maximum diameter of 12 microns (for the best results 6 microns) and a purity of 99 wt. % or more. Ni powder has an average diameter of 1 to 5 microns (for the best results 1 to 3 microns) and a maximum diameter of 12 micron meters (for the best results 6 micron meters). Carbon powder such as carbon black powder has a specific surface of 50 to 150 $m^2/g$ (for the best results 80 to 150 $m^2/g$), a purity of 99.9 wt. % or more, an average diameter of 10 to 100 nanometers (for the best results 10 to 50 nanometers) and a maximum diameter of 150 nanometers (for the best results 100 nanometers).

The sintered titanium boride ceramic body can be produced as follows:

As a first step, 75-99 wt. % $TiB_2$ particles are mixed with 1-25 wt. % in total of Ni powder and C powder to thereby make a mixture.

Preferably the, $TiB_2$ particles have an average particle diameter of 0.5 to 8 microns (for the best results 0.5 to 3 microns), a maximum diameter of 12 microns (for the best results 6 microns) and a purity of 99 wt. % or more. Ni powder has an average diameter of 1 to 5 microns (for the best results 1 to 3 microns) and a maximum diameter of 12 microns (for the best results 6 microns). C powder such as carbon black powder has a specific surface area of 50 to 150 $m^2/g$ (for the best results 80 to 150 $m^2/g$), a purity of 99.9 wt. % or more, an average diameter of 10 to 100 nanometers (for the best results 10 to 50 nanometers) and a maximum diameter of 150 nanometers (for the best results 100 nanometers).

The preferred weight ratio of Cr powder/C powder is from 7:0.1 to 7:10.

As a second step, the mixture is further mixed so as to be homogeneous.

In a third step, the mixture is set in a mold together with a binder such as polyvinylalcohol. After that, a pressure of 100-800 $Kg/cm^2$ is uniaxially applied to the mixture to thereby make a green compact.

In a fourth step, a pressure of 800-3,500 $Kg/cm^2$ is further applied to the green compact, for example, by a cold isostatic press method so that the ceramic body is shaped, for example, into the form of a nozzle or sleeve.

As a fifth step, the shaped ceramic body is sintered at 1,500°-2,000° C. (preferably 1,600°-1,800° C.) by a pressureless method or under a pressure of 100-500 $Kg/cm^2$ in non-oxidizing atmosphere such as Ar or $H_2$ gas to thereby make a sintered ceramic body.

BRIEF DESCRIPTION OF THE DRAWINGS

FIG. 2 is a graphic view showing the relationship between amount of Cr added and bending strength in the case of a sintered body consisting of 99 wt. % $TiB_2$ and 1 wt. % C of;

EXAMPLE (1)

1 wt. % C was added to 99 wt. % $TiB_2$ and further 0-14 wt. % Cr was added. The mixture was fired by pressureless sintering at 1,900° C. for one hour within Ar. The test results for such a sintered body are shown in Table 1 and FIGS. 1 and 2.

Figure 1:
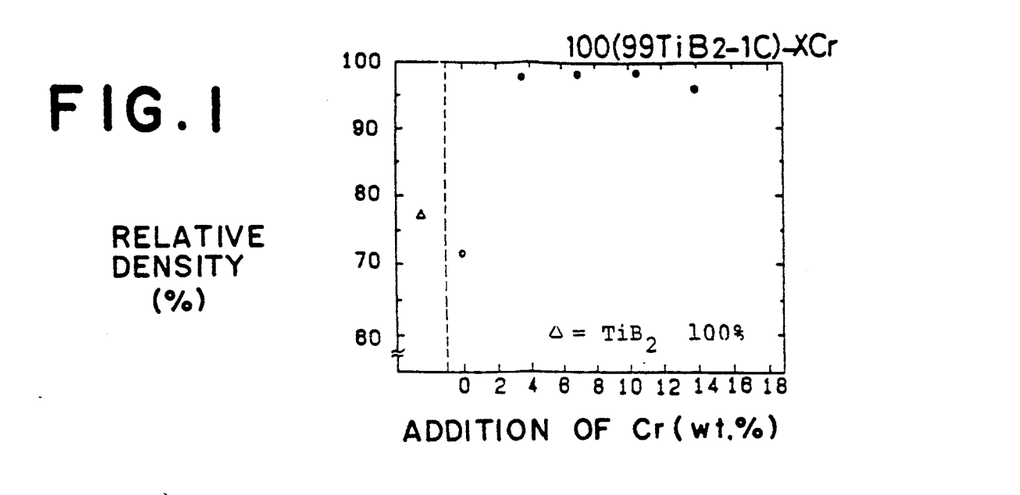
FIG. 1 is a graphic view showing the relationship between the amount of Cr added and relative density in the case of a sintered body consisting of 99 wt. % $TiB_2$ and 1 wt. % C.

In FIG. 1, small circles illustrate how addition of Cr affects relative density of a sintered body which consists of 99 wt. % $TiB_2$ and 1 wt. % C, and a triangle illustrates the relative density of a sintered body which consists of 100 wt. % $TiB_2$. As shown in Table 1, the bending strength ranges between 109 MPa and 376 MPa, which is high as compared with the prior art result. Also, the relative density is high.

EXAMPLE (2)

1 wt. % C was added to 99 wt. % $TiB_2$ so as to form a mixture. After that, 7 parts Cr were added to 100 parts of the mixture and the mixture was shaped and fired by hot pressing at 1,900° C. for one hour within Ar. The experimental results for such a sintered body are shown in Table 2 and FIG. 2.

Figure 2:
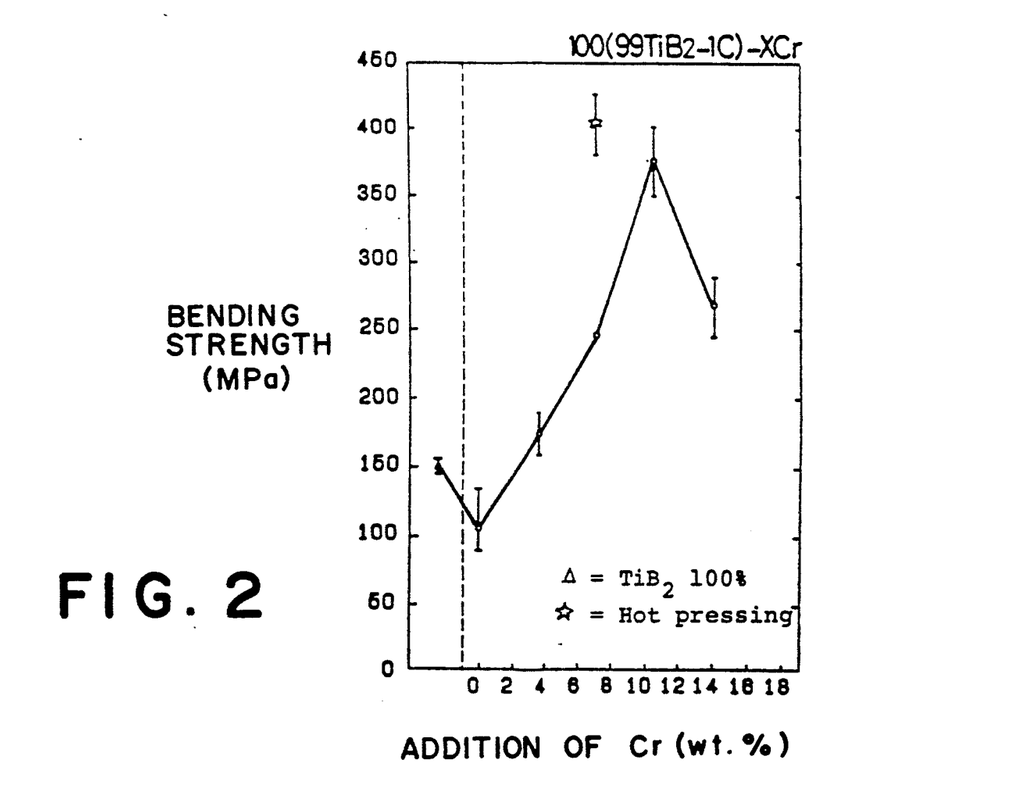

In FIG. 2, small circles illustrate how addition of Cr affects relative density of a sintered body which consists of 99 wt. % $TiB_2$ and 1 wt. % C, and a triangle illustrates the relative density of a sintered body which consists of 100 wt. % $TiB_2$. A star denotes the characteristics of a fired body produced by hot pressing at 1,900° C. for 30 minutes under 30 MPa in an Ar atmosphere.

EXAMPLE (3)

Various mixtures having weight ratios of (Cr/C) in $TiB_2$ of 7:0, 7:1, 7:1.5, and 7:2 respectively, were prepared. Each mixture was fired for pressureless sintering at 1,900° C. for one hour within an Ar atmosphere.

Figure 3:
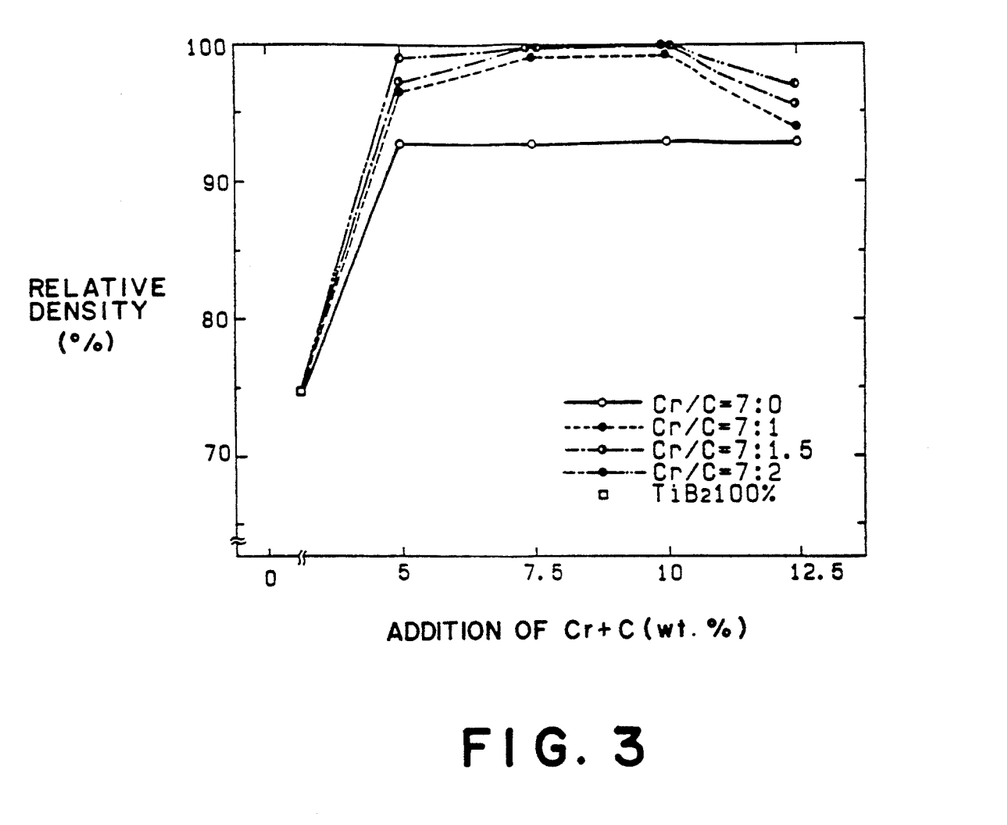
FIG. 3 is a graphic view showing relationships between amount of addition of (Cr+C) and relative density.
Figure 4:
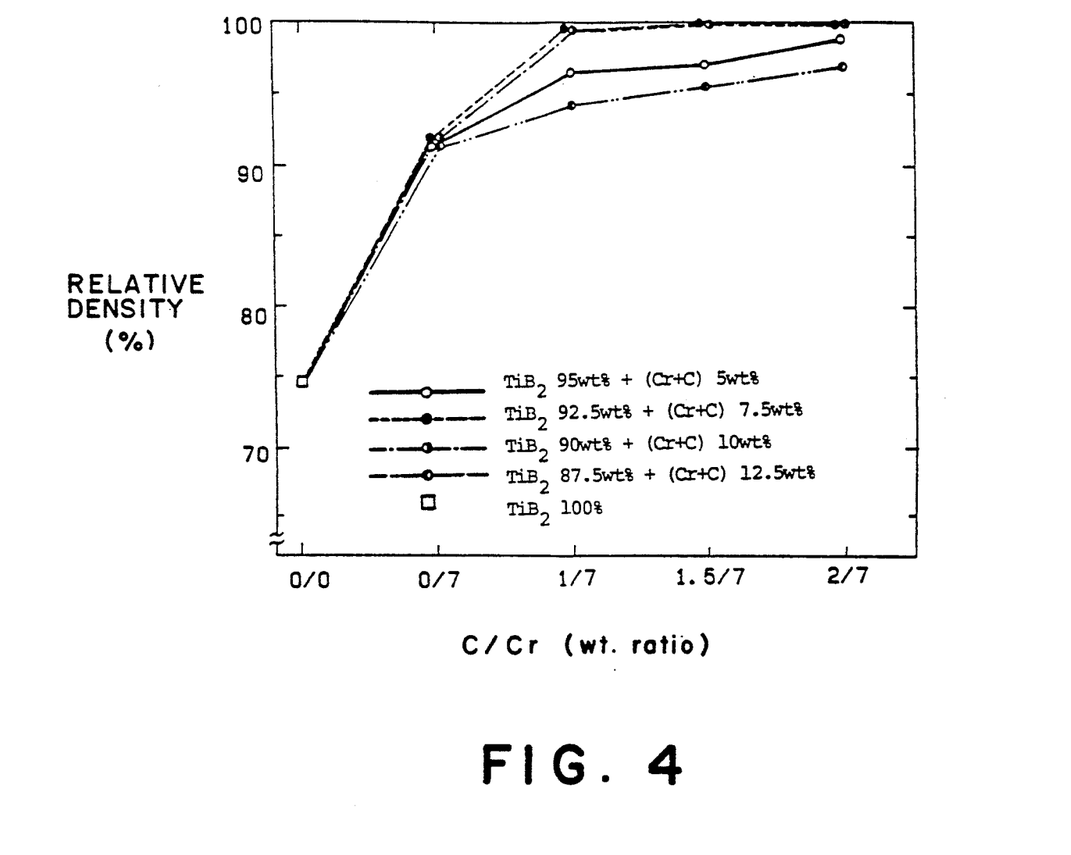
FIG. 4 is a graphic view showing relationships between the weight ratio of C/Cr and relative density.
Figure 5:
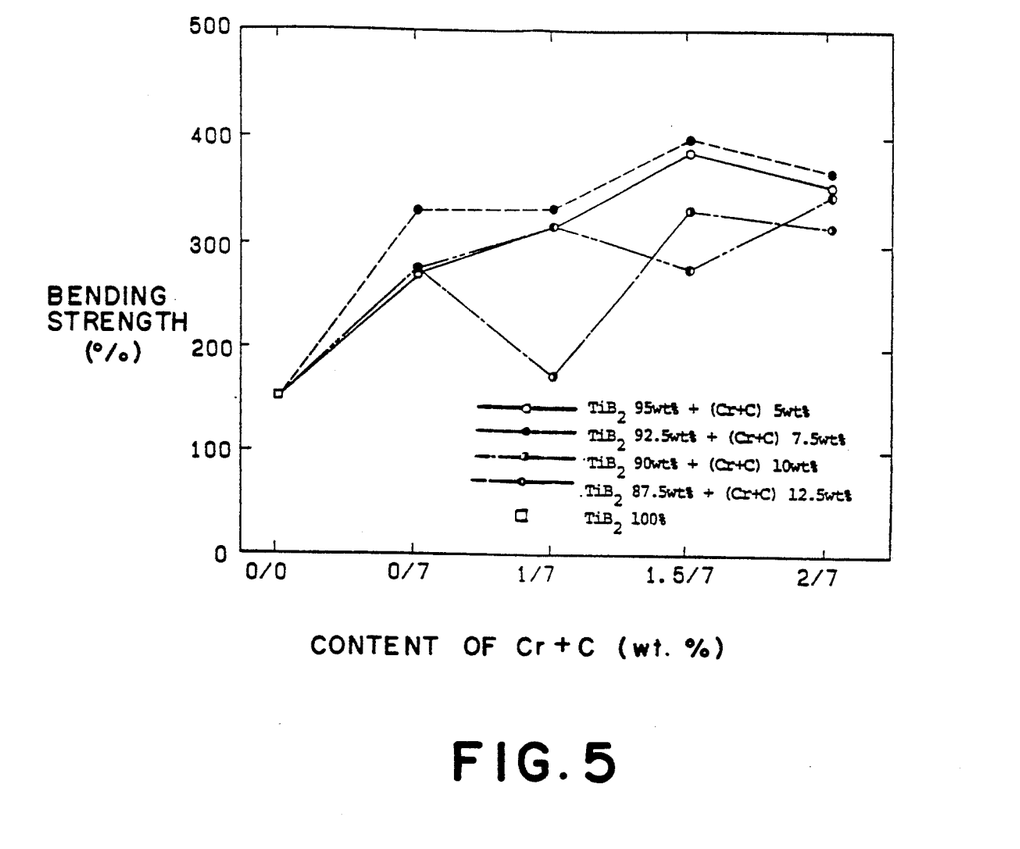
FIG. 5 is a graphic view showing relationships between amount of addition of (Cr+C) and bending strength.
Figure 6:
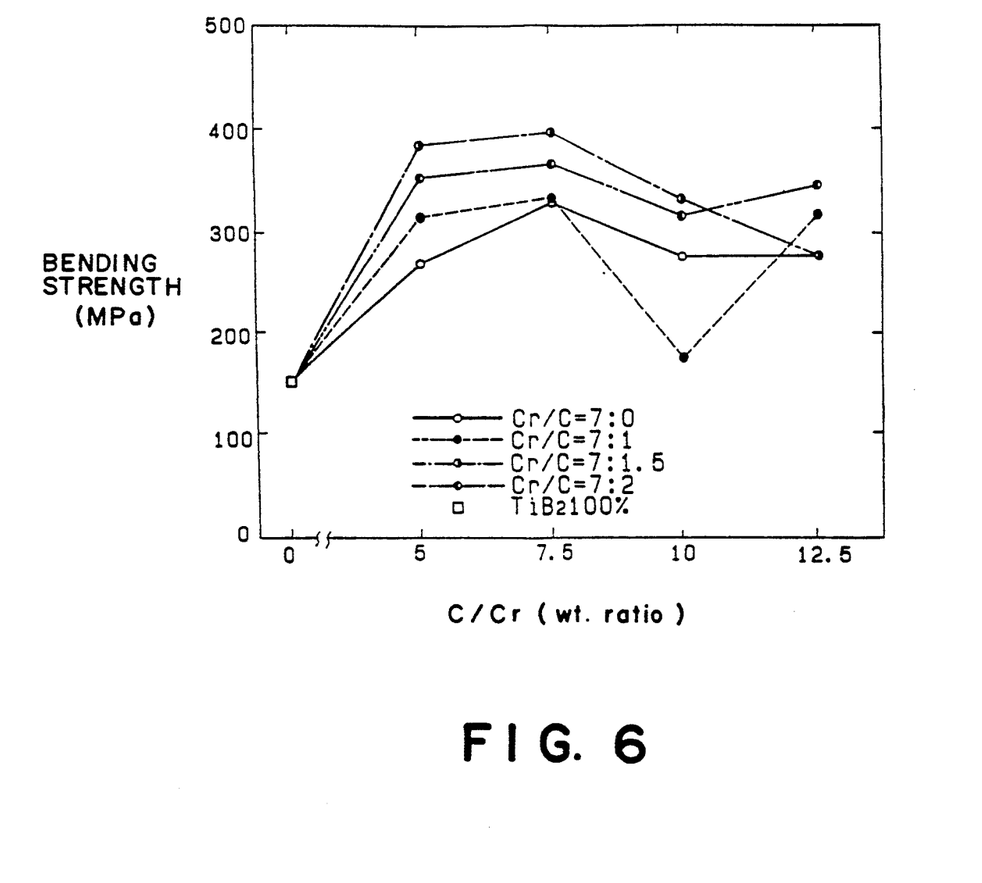
FIG. 6 is a graphic view showing relationships between the weight ratio of C/Cr and bending strength.

The experimental results are shown in Table 3 and FIGS. 3 through 6. FIG. 3 shows relationships between relative density and total amount of addition of (Cr+C). FIG. 4 shows relationships between relative density and weight ratio of C/Cr in the case where a mixture is fired at 1,900° C. for one hour within an Ar atmosphere. FIG. 5 shows relationships between bending strength and total amount of addition of (Cr+C) in the case where a mixture is fired at 1,900° C. for one hour within an Ar atmosphere. FIG. 6 shows relationships between bending strength and weight ratio of C/Cr under the same conditions. In FIGS. 3 to 6, rectangles denote the relationship for the case where $TiB_2$ is 100 wt. %. It can be observed that the relative densities are high and the maximum bending strength is 398 MPa if the total amount of addition of (Cr+C) is 7.5 wt. % wherein the weight ratio of Cr:C is 7:1.5.

In FIGS. 4 and 5, the meanings of the various symbols are as follows:
○: $TiB_2$ of 95 wt. %+(Cr+C) of 5 wt. %
●: $TiB_2$ of 92.5 wt. %+(Cr+C) of 7.5 wt. %
●: $TiB_2$ of 90 wt. %+(Cr+C) of 10 wt. %
●: $TiB_2$ of 87.5 wt. %+(Cr+C) of 12.5 wt. %
☐: 100% $TiB_2$ The weight ratios of (Cr/C) in $TiB_2$ are 7:0, 7:1, 7:1.5 and 7:2, respectively, in the examples shown in FIGS. 4 and 5.
EXAMPLE (4) metal boride+M+C
EXAMPLE (5) metal boride+Cr+C
EXAMPLE (6) $TiB_2$+M+C
EXAMPLE (7) $TiB_2$+Cr+C
EXAMPLE (8) metal boride+metal carbide
EXAMPLE (9) metal boride+chromium carbide
EXAMPLE (10) metal boride+$Cr_3C_2$
EXAMPLE (11) $TiB_2$+metal carbide
EXAMPLE (12) $TiB_2$+chromium carbide
EXAMPLE (13) $TiB_2$+$Cr_3C_2$
EXAMPLE (14-19) C is added into each of the above-stated combinations in the examples (8) to (13).
In these examples, M denotes a metal.

EXAMPLE (20)

Figure 7:
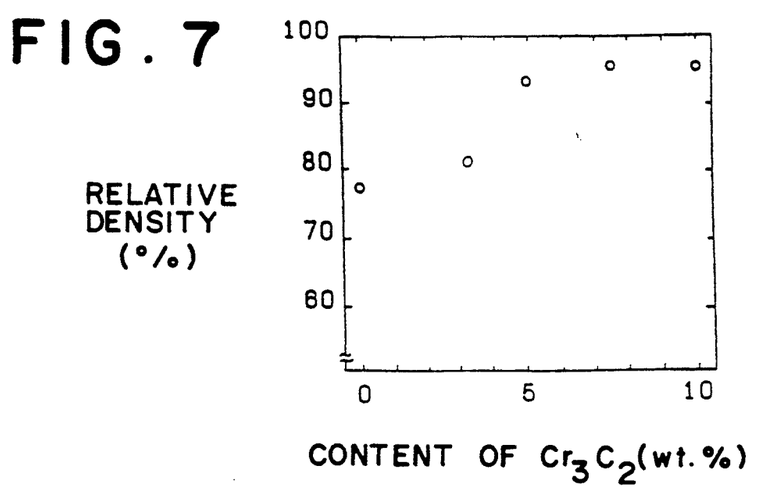
FIG. 7 is a graphic view showing the relationship between amount of addition of $Cr_3C_2$ and relative density.
Figure 8:
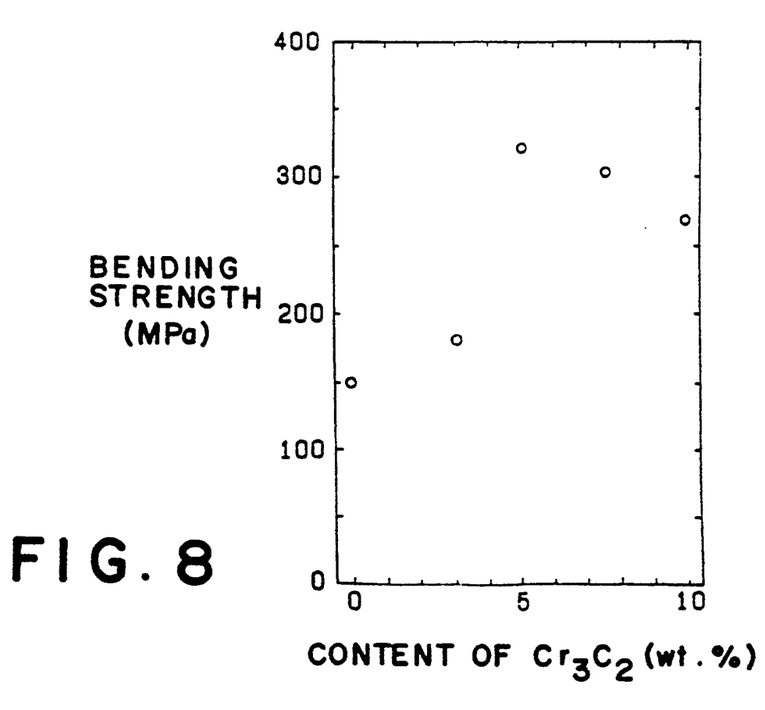
FIG. 8 is a graphic view showing the relationship between amount of $Cr_3C_2$ added and bending strength.

0-10 wt. % Chromium carbide was added to $TiB_2$ to thereby make a mixture. This mixture was shaped and fired by pressureless sintering at 1,900° C. for one hour within an Ar atmosphere. The experimental results are shown in Table 4 and FIGS. 7 and 8. It can be observed that the relative densities are high and the maximum bending strength is 321 MPa.

EXAMPLE (21)

97.5 wt. % $TiB_2$ particles having an average diameter of 3 microns, a maximum diameter of 6 microns and a purity of 99 wt. % are mixed with 2.5 wt. % in total of Ni powder having an average diameter of 1 microns and carbon black powder having a specific surface area of 135 m$^2$/g and a purity of 99 wt. % to thereby make a mixture. The weight ratio of Ni/C is 7:1. 100 parts of the mixture are placed in a plastic container together with urethane balls and 300 parts ethylenealchol and then mixed in a wet condition for 24 hours. The mixture is maintained at 60° C. for 10 hours so as to be dried.

After that, of the mixture 100 parts is set in a mould together with 2 parts of polyvinylalcohol as a binder. A pressure of 300 Kg/cm$^2$ is uniaxially applied to the mixture to thereby make a green compact. In addition, a pressure of 3,000 Kg/cm$^2$ is applied to the green compact by a cold isostatic press method to thereby shape the ceramic body into the form of a desired rolling sleeve.

The shaped ceramic body is heated to 1,700° C. at a temperature rising rate of 15° C./minute in an Ar atmosphere by a pressureless method and then maintained at 1,700° C. for one hour to thereby make a sintered ceramic body.

According to this invention, it is easy to manufacture a metal boride ceramic material having high density, high strength and high hardness.

TABLE 1

| No. | Composition (wt. %) | Firing Condition | Relative Density (%) | Bending Strength (MPa) |
|---|---|---|---|---|
| 1 | $TiB_2$ 100% | 1900° C. × 1 Hr. in Ar | 77 | 150 |
| 2 | $TiB_2$ 99% + C 1% | " | 71 | 109 |
| 3 | ($TiB_2$ 99% + C 1%) + Cr 3.5% | " | 98 | 175 |
| 4 | ($TiB_2$ 99% + C 1%) + Cr 7% | " | 98 | 246 |
| 5 | ($TiB_2$ 99% + C 1%) + Cr 10.5% | " | 98 | 376 |
| 6 | ($TiB_2$ 99% + C 1%) + Cr 14% | " | 96 | 265 |

TABLE 2

| No. | Composition (wt. %) | Firing Condition | Relative Density (%) | Bending Strength (MPa) |
|---|---|---|---|---|
| 1 | ($TiB_2$ 99% + C 1%) + Cr 7% | 1900° C. × 30 min, in Ar 30 MPa, in Ar | 100 | 406 |

TABLE 3

| No. | $TiB_2$ (wt. %) | Cr + C (wt. %) | wt. ratio of Cr/C | Firing Condition | Relative Density (%) | Bending Strength (MPa) |
|---|---|---|---|---|---|---|
| 4 | 95 | 5 | 7:0 | 1900° C. × 1 Hr, in Ar | 93 | 269 |
| 5 | " | " | 7:1 | 1900° C. × 1 Hr, in Ar | 96 | 315 |
| 6 | " | " | 7:1.5 | 1900° C. × 1 Hr, in Ar | 97 | 386 |
| 7 | " | " | 7:2 | 1900° C. × 1 Hr, in Ar | 99 | 355 |
| 8 | 92.5 | 7.5 | 7:0 | 1900° C. × 1 Hr, in Ar | 93 | 329 |
| 9 | " | " | 7:1 | 1900° C. × 1 Hr, in Ar | 100 | 331 |
| 10 | " | " | 7:1.5 | 1900° C. × 1 Hr, in Ar | 100 | 398 |
| 11 | " | " | 7:2 | 1900° C. × 1 Hr, in Ar | 100 | 368 |
| 12 | 90 | 10 | 7:0 | 1900° C. × 1 Hr, in Ar | 93 | 275 |
| 13 | " | " | 7:1 | 1900° C. × 1 Hr, in Ar | 99 | 171 |
| 14 | " | " | 7:1.5 | 1900° C. × | 100 | 332 |

TABLE 3-continued

| No. | TiB$_2$ (wt. %) | Cr + C (wt. %) | wt. ratio of Cr/C | Firing Condition | Relative Density (%) | Bending Strength (MPa) |
|---|---|---|---|---|---|---|
| 15 | " | " | 7:2 | 1900° C. × 1 Hr, in Ar | 100 | 316 |
| 16 | 87.5 | 12.5 | 7:0 | 1900° C. × 1 Hr, in Ar | 93 | 272 |
| 17 | " | " | 7:1 | 1900° C. × 1 Hr, in Ar | 94 | 316 |
| 18 | " | " | 7:1.5 | 1900° C. × 1 Hr, in Ar | 96 | 274 |
| 19 | " | " | 7:2 | 1900° C. × 1 Hr, in Ar | 97 | 343 |

TABLE 4

| No. | Condition (wt. %) | Firing Condition | Relative Density (%) | Bending Strength (MPa) |
|---|---|---|---|---|
| 1 | Ti B$_2$ 100% | 1900° C. × 1 Hr, in Ar | 77 | 150 |
| 2 | Ti B$^2$ 97% + Cr$_3$C$_2$ 3% | 1900° C. × 1 Hr, in Ar | 81 | 180 |
| 3 | TiB$_2$ 95% + Cr$_3$C$_2$ 5% | 1900° C. × 1 Hr, in Ar | 93 | 321 |
| 4 | TiB$_2$ 92.5% + Cr$_3$C$_2$ 7.5% | 1900° C. × 1 Hr, in Ar | 96 | 302 |
| 5 | Ti B$_2$ 90% + Cr$_3$C$_2$ 10% | 1900° C. × 1 Hr, in Ar | 96 | 267 |

We claim:

1. A sintered metal boride ceramic body consisting essentially of:
    a metal boride matrix in the form of a solid solution consisting essentially of nickel boride and TiC; and
    TiB$_2$ particles dispersed in the metal boride matrix, said ceramic body being produced by:
    admixing TiB$_2$, Ni and C to form an admixture consisting essentially of TiB$_2$, Ni and C;
    shaping said admixture; and
    firing the shaped admixture.

2. The sintered metal boride ceramic body of claim 1, wherein the nickel boride is NiB.

3. The sintered metal boride ceramic body of claim 1, wherein the nickel boride is Ni$_3$B.

4. The sintered metal boride ceramic body of claim 1, wherein the ceramic body has a relative density of at least 95%.

5. The sintered metal boride ceramic body of claim 1, wherein the TiB$_2$ powder has an average particle diameter of 0.5 to 8 microns.

6. The sintered metal boride ceramic body of claim 1, wherein the ceramic body is shaped as a sleeve for rolling or looping a wire rod.

7. The sintered metal boride ceramic body of claim 1, wherein the ceramic body is shaped as a nozzle.

* * * * *